United States Patent
Holota et al.

(10) Patent No.: US 8,009,369 B2
(45) Date of Patent: Aug. 30, 2011

(54) APOCHROMATIC LENS

(75) Inventors: Wolfgang Holota, Bad Toelz (DE);
Gerald Mathe, Munich (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 12/480,356

(22) Filed: Jun. 8, 2009

(65) Prior Publication Data

US 2009/0303614 A1 Dec. 10, 2009

(30) Foreign Application Priority Data

Jun. 9, 2008 (DE) .................. 10 2008 027 414

(51) Int. Cl.
*G02B 3/00* (2006.01)
(52) U.S. Cl. ........................ 359/722; 359/793
(58) Field of Classification Search .............. 359/708, 359/722, 723, 738, 754–795
See application file for complete search history.

(56) References Cited

U.S. PATENT DOCUMENTS

| | | | | |
|---|---|---|---|---|
| 2,520,633 A | * | 8/1950 | Grey | 359/731 |
| 2,578,624 A | * | 12/1951 | Back et al. | 359/774 |
| 3,306,695 A | * | 2/1967 | Baker | 359/714 |
| 4,915,483 A | * | 4/1990 | Robb | 359/665 |
| 4,955,701 A | * | 9/1990 | Kataoka et al. | 359/738 |
| 5,305,138 A | | 4/1994 | Freedenberg et al. | |
| 7,271,965 B1 | | 9/2007 | Oskotsky et al. | |

* cited by examiner

*Primary Examiner* — Darryl J Collins
(74) *Attorney, Agent, or Firm* — Greenblum & Bernstein, P.L.C.

(57) ABSTRACT

An apochromatic lens with an aperture and exclusively refractive optical elements, comprising a plurality of lenses arranged in lens groups along an optical axis, wherein lenses of different materials are provided and wherein the lenses respectively comprise one of the following listed materials: calcium fluoride ($CaF_2$), synthetic quartz ($SiO_2$) or another radiation-resistant optical material.

20 Claims, 1 Drawing Sheet

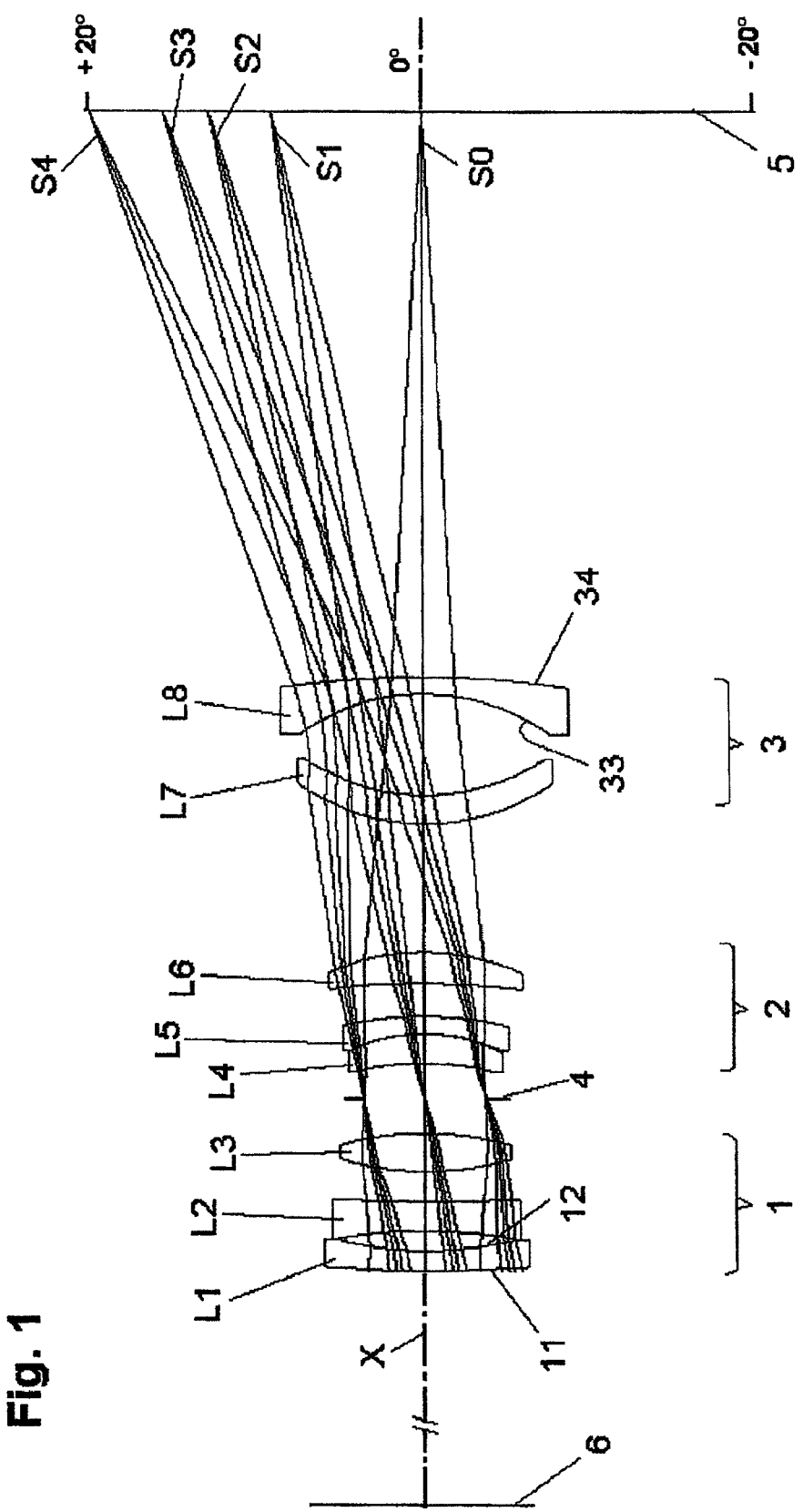

APOCHROMATIC LENS

CROSS-REFERENCE TO RELATED APPLICATIONS

The present application claims priority under 35 U.S.C. §119 of German Patent Application No. 10 2008 027 414.3-51, filed on Jun. 9, 2008, the disclosure of which is expressly incorporated by reference herein in its entirety.

BACKGROUND OF THE INVENTION

1. Field of the Invention

The present invention relates to an apochromatic lens, in particular an apochromatic lens that is suitable for use in photogrammetry in space and/or on the earth.

2. Discussion of Background Information

In environments with high radiation load, for example, short-wave electromagnetic radiation or particle radiation (for example, electrons, neutrons or ions), a degradation of the optical glasses used for the lenses often occurs. This degradation results in a reduction of the transmission of the lenses affected.

Furthermore, a high imaging precision over a large wavelength range is required for use in space as well as for use on earth. In particular the chromatic aberration over a large wavelength range is to be minimized.

Conventional lenses, for example, for whole-plate cameras, do not use any radiation-resistant optical materials and are not apochromatically corrected over a large wavelength range, in particular not for the wavelength range of 400 nm to 1,000 nm desirable in photogrammetry. The same applies to lenses that are conventionally used for photogrammetric applications. Commercially available photographic lenses furthermore do not provide a large enough image area for photogrammetric applications. Although lenses of radiation-resistant materials are known, for example, exposure lenses for semiconductor lithography, these lenses are chromatically corrected only in a very narrow wavelength range. Although optical constructions based on mirrors do not exhibit any chromatic aberration and are also suitable for environments with high radiation load, only a very limited image area can be realized with these mirror constructions.

SUMMARY OF THE INVENTION

The invention provides an apochromatic lens that works in a virtually distortion-free manner with a large image area and is apochromatically corrected over a wide frequency band.

The apochromatic lens is provided with an aperture and exclusively refractive optical elements, comprising a plurality of lenses arranged in lens groups along an optical axis, wherein lenses of different materials are provided and wherein the lenses respectively comprise one of the following listed materials: calcium fluoride ($CaF_2$), synthetic quartz ($SiO_2$) or another radiation-resistant optical material.

The desired high efficiency of the lens is achieved through the selection of exclusively refractive optical elements and the special selection of materials. The lens is apochromatically corrected for a wavelength range of 400 nm to 1,000 nm. The polychromatic contrast with a spatial frequency of 100 lp/mm (line pairs per millimeter) is thereby 0.2 or better and with a spatial frequency of 60 lp/mm the polychromatic contrast is 0.4 or better. These contrast powers are achieved over the entire wavelength range of 400 nm to 1,000 nm. Furthermore, according to the present invention the lens achieves these contrast powers over the entire wavelength range of 400 nm to 1,000 nm within a field angle range of −20° to +20°.

Furthermore, the lens according to the invention is radiation-resistant and can thus be used under space conditions as well as under conditions on earth.

In certain embodiments, the lenses are made from two of the materials calcium fluoride ($CaF_2$), synthetic quartz ($SiO_2$) or another radiation-resistant optical material.

In certain embodiments, the lenses are made from three of the materials calcium fluoride ($CaF_2$), synthetic quartz ($SiO_2$) or another radiation-resistant optical material.

In yet other embodiments, at least one of the lenses is made from a radiation-resistant optical material other than $CaF_2$ or $SiO_2$.

This other radiation-resistant optical material preferably comprises cerium oxide ($CeO_2$) as one of its constituents. The content of $CeO_2$ is preferably at least 0.5 percent by weight. A content of $CeO_2$ in the range of 1.8 to 2.0 percent by weight is particularly preferred.

In certain embodiments, the aperture is provided between the first lens group and the second lens group.

In other preferred embodiments, at least two lenses respectively have an aspherical surface.

In further preferred embodiments, three lenses respectively have an aspherical surface.

At least one aspherical surface is preferably provided in front of the aperture in the direction of the optical axis, and at least one aspherical surface is preferably provided behind the aperture in the direction of the optical axis, so that at least one aspherical surface is located on both sides of the aperture.

In a preferred embodiment, one of the lens surfaces of the lenses of the second lens group is embodied aspherically.

It is advantageous thereby if one of the lens surfaces of the lens facing towards the object plane in the first lens group is embodied aspherically.

Alternatively or additionally, one of the lens surfaces of the lens facing towards the image plane in the third lens group can be embodied aspherically.

Other exemplary embodiments and advantages of the present invention are not limited to the disclosure herein but may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein FIG. 1 depicts a diagrammatic example of the structure of an apochromatic lens according to the invention.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1 is a diagrammatic representation of the structure of an apochromatic lens according to the invention. The lens comprises three lens groups 1, 2, 3, which are arranged on an optical axis X one behind the other and at a distance from one another and attached to a lens housing (not shown) in a manner known to one skilled in the art. An aperture 4 is provided between the first lens group 1 and the second lens group 2, which aperture is shown in FIG. 1 diagrammatically by two vertical lines.

The first lens group 1 comprises three lenses L1, L2, and L3 arranged one behind the other along the optical axis X. The second lens group 2 likewise comprises three lenses L4, L5, and L6. The third lens group 3 comprises two lenses L7, and L8. An image plane 5 is shown diagrammatically to the right of the third lens group 3. An object plane 6 located at a far distance is shown diagrammatically to the left of the first lens group 1.

The first lens L1, facing towards the object plane 6, of the first lens group 1 has a negative refractive power and comprises synthetic quartz ($SiO_2$) or another radiation-resistant optical material (SR) with the exception of calcium fluoride ($CaF_2$).

The second lens L2 of the first lens group 1 likewise has a negative refractive power and comprises synthetic quartz ($SiO_2$) or another radiation-resistant optical material (SR) with the exception of calcium fluoride ($CaF_2$). The materials from which the first lens L1 and the second lens L2 of the first lens group 1 are produced are different.

The third lens L3, located closest to the aperture 4, of the first lens group 1 has a positive refractive power and comprises calcium fluoride ($CaF_2$).

A suitable optical glass of synthetic quartz ($SiO_2$) can be obtained, for example, from Schott under the product name "LITHOSIL-Q." A suitable optical glass of calcium fluoride ($CaF_2$) can be obtained, for example, from Schott under the product name "LITHOTEC-CAF2." Another suitable radiation-resistant optical material (SR) is, for example, optical glass with an addition of at least 0.5% by weight cerium oxide ($CeO_2$). In this context, "radiation-resistant" means optical materials, the transmission property of which does not essentially change under the action of a high radiation load, for example, short-wave electromagnetic radiation or particle radiation (for example, electrons, neutrons or ions). Examples of other radiation-resistant optical materials of this type are, for example, optical glasses obtainable from Schott under the product name "BK7G18" or "K5G20."

The second lens group 2, which comprises the lens L4 located closest to the aperture 4 and two other lenses L5 and L6, contains a lens surface that is embodied aspherically. The remaining lens surfaces of the second group 2 are embodied spherically. This aspherical embodiment of one of the lens surfaces in the second lens group 2 serves to correct the spherical aberration. The special location of this second lens group 2 near the aperture 4 makes it possible to correct the longitudinal chromatic aberration.

The third lens group 3 with the lenses L7 and L8 is provided on the side of the second lens group 2 facing away from the aperture 4 in the direction along the optical axis X at a distance from the second lens group 2. The lens L8 is thereby the lens that is located closest to the image plane 5. The lens L7 as well as the lens L8 comprises calcium fluoride ($CaF_2$), synthetic quartz ($SiO_2$) or another radiation-resistant optical material (SR). However, the materials from which the lenses L7 and L8 are made are different.

The apochromatic lens shown in FIG. 1 can be realized in two different constructions. A first construction, which is suitable in particular for use in space and is called the space version, is embodied in a particularly light manner and can have a mass of less than one kilogram. This construction variant has three aspherical lens surfaces. Either the front lens surface 11 facing towards the object plane 6 or the rear lens surface 12 facing away from the object plane 6 of the first lens L1 is thereby embodied aspherically. The rest of the lens surfaces of lenses L1, L2 and L3 in the first lens group 1 are embodied spherically.

Furthermore, as stated above, one of the lens surfaces in the lens group 2 is embodied aspherically. The rest of the lens surfaces comprising lenses L4, L5 and L6 in the second lens group 2 are embodied spherically. Finally, for the first construction variant suitable for use in space, either the rear lens surface 34 facing towards the image plane 5 or the front lens surface 33 facing away from the image plane of the eighth lens L8 in the third lens group 3 is embodied aspherically. The rest of the lens surfaces of the lenses L7 and L8 in the third lens group 3 are embodied spherically.

An alternative embodiment of the apochromatic lens is provided for use on earth (terrestrial version). It is thereby not subject to the restrictive mass limitations that are necessary for use in space. The terrestrial construction variant can therefore be designed with larger lenses and thus a larger weight, so that it may be sufficient here to provide only two aspherical lens surfaces.

In this terrestrial variant with only two aspherical lens surfaces, compared to the space version, the aspherical design of the lens surface of lens L1 or the aspherical design of the lens surface of lens L8 can be omitted and the relevant lens surface can likewise be embodied in a spherical manner. In this case only the aspherical lens surface in the second lens group 2 and either the aspherical design of the front lens surface 11 or the rear lens surface 12 of the first lens L1 or the aspherical design of the front lens surface 33 or the rear lens surface 34 of the lens L8 are provided.

The aspherical surfaces on the lenses L1 and/or L8 correct the transverse chromatic aberrations and the distortion over the entire image field and thus produce a quasi distortion-free property. This term "quasi distortion-free" is to be interpreted in the scope of the present invention in that the maximum distortion occurring within an image field with a field angle of +20° to −20° is smaller in terms of amount than 0.02%. This is shown in FIG. 1 by the five bundles of rays S0, S1, S2, S3 and S4, wherein the bundle of rays S0 represents the axial ray at a field angle of 0° and the bundle of rays S4 represents the ray furthest deflected at a field angle of +20°.

The structure of the apochromatic lens shown in FIG. 1 in conjunction with the provision of the aspherical surfaces according to the space version or according to the terrestrial version produces the desired broadband apochromatic correction in a wavelength range of 400 nm to 1,000 nm.

Due to its high freedom from distortion, the apochromatic lens according to the invention can also be used in connection with so-called TDI detectors (time-delayed integration).

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMBERS

1 Lens group
2 Lens group
3 Lens group
4 Aperture
5 Image plane
6 Object plane
11 Front lens surface
12 Rear lens surface
33 Front lens surface
34 Rear lens surface
L1 Lens
L2 Lens
L3 Lens
L4 Lens
L5 Lens
L6 Lens
L7 Lens
L8 Lens
X Axis

The invention claimed is:

1. An apochromatic lens, comprising
   at least one aperture and
   exclusively refractive optical elements, comprising at least two lenses arranged in lens groups along an optical axis,
   wherein the at least two lenses comprise different materials, and
   wherein the different materials are selected from
      calcium fluoride ($CaF_2$),
      synthetic quartz ($SiO_2$), and
      another radiation-resistant optical material.

2. The apochromatic lens according to claim 1, wherein the at least two lenses comprise two of the different materials.

3. The apochromatic lens according to claim 1, wherein the at least two lenses comprise three of the different materials.

4. The apochromatic lens according to claim 1, wherein at least one of the at least two lenses is made from a radiation-resistant optical material other than $CaF_2$ or $SiO_2$.

5. The apochromatic lens according to claim 1, wherein the radiation-resistant optical material comprises cerium oxide ($CeO_2$).

6. The apochromatic lens according to claim 5, wherein the radiation-resistant optical material has a content of cerium oxide ($CeO_2$) of at least 0.5% by weight.

7. The apochromatic lens according to claim 6, wherein the radiation-resistant optical material has a content of cerium oxide ($CeO_2$) between 1.8% by weight and 2.0% by weight.

8. The apochromatic lens according to claim 1, wherein the lens groups comprise a first lens group and a second lens group, and wherein the aperture is provided between the first lens group and the second lens group.

9. The apochromatic lens according to claim 1, wherein the at least two lenses have an aspherical surface.

10. The apochromatic lens according to claim 9, wherein at least three lenses have an aspherical surface.

11. The apochromatic lens according to claim 9, wherein at least one aspherical surface is provided in front of the aperture in line with the optical axis, and at least one aspherical surface is provided behind the aperture in line with the optical axis.

12. The apochromatic lens according to claim 9, wherein the lens groups comprise a first lens group and second lens group, and wherein one of the lens surfaces of the lenses of the second lens group is embodied aspherically.

13. The apochromatic lens according to claim 12, wherein one of the lens surfaces of the lens facing towards an object plane in the first lens group is embodied aspherically.

14. The apochromatic lens according to claim 12, wherein the lens groups further comprise a third lens group, and wherein one of the lens surfaces of the lens facing towards an image plane in the third lens group is embodied aspherically.

15. The apochromatic lens according to claim 14, wherein one of the lens surfaces of the lens facing towards the object plane in the first lens group is embodied aspherically and that one of the lens surfaces of the lens facing towards the image plane in the third lens group is embodied aspherically.

16. A method for correcting transverse chromatic aberrations over an image field, comprising:
   bundling light through an apochromatic lens to produce a quasi distortion free image, wherein the apochromatic lens comprises,
   at least one aperture and
   exclusively refractive optical elements, comprising at least two lenses arranged in lens groups along an optical axis,
   wherein the at least two lenses comprise different materials, and
   wherein the different materials are selected from
      calcium fluoride ($CaF_2$),
      synthetic quartz ($SiO_2$), and
      another radiation-resistant optical material.

17. The method according to claim 16, wherein the at least two lenses comprise two of the different materials.

18. The method according to claim 16, wherein the at least two lenses comprise three of the different materials.

19. The method according to claim 16, wherein the radiation-resistant optical material comprises cerium oxide ($CeO_2$).

20. The method according to claim 19, wherein the radiation-resistant optical material has a content of cerium oxide ($CeO_2$) of at least 0.5% by weight.

* * * * *